Figure 6:
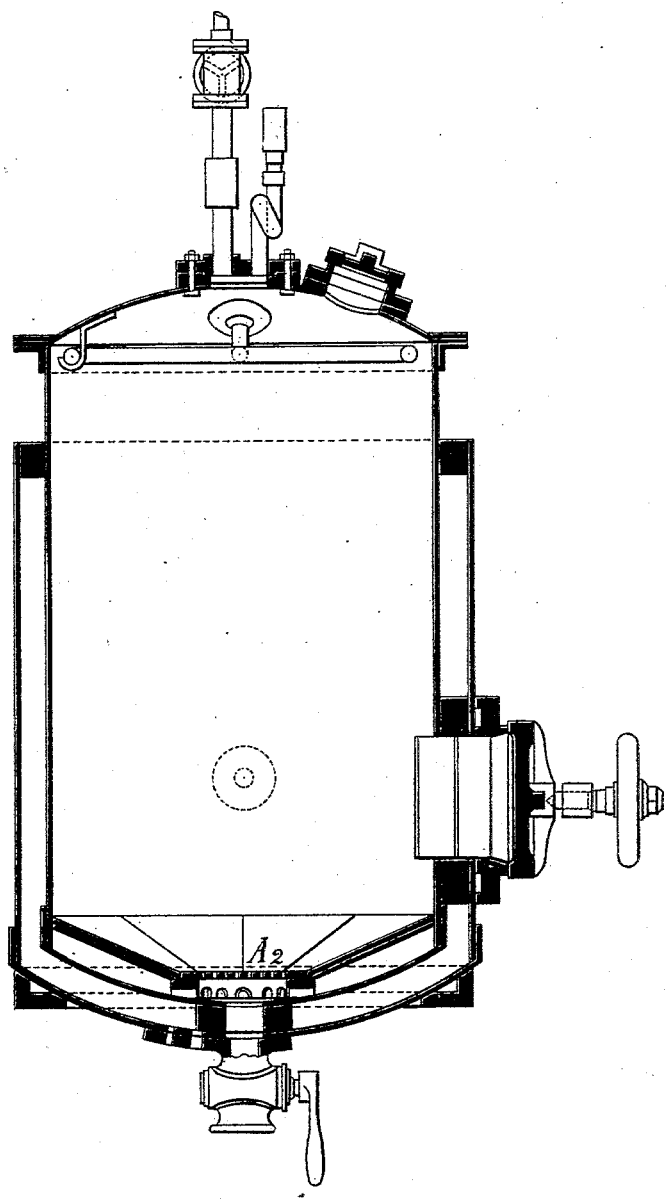

(No Model.) 4 Sheets—Sheet 1.
C. ZIMMER.
PROCESS OF PREPARING AND PURIFYING WORT FOR BREWING PURPOSES.
No. 315,876. Patented Apr. 14, 1885.
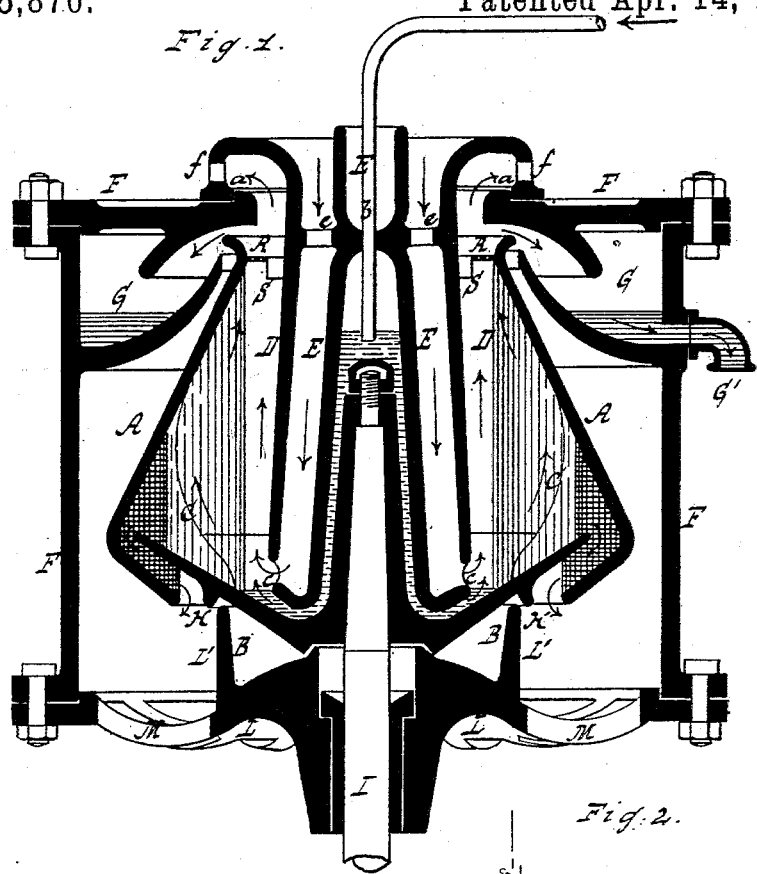
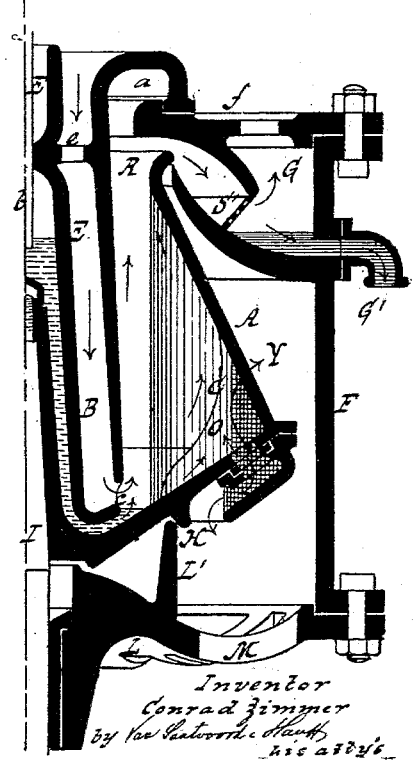
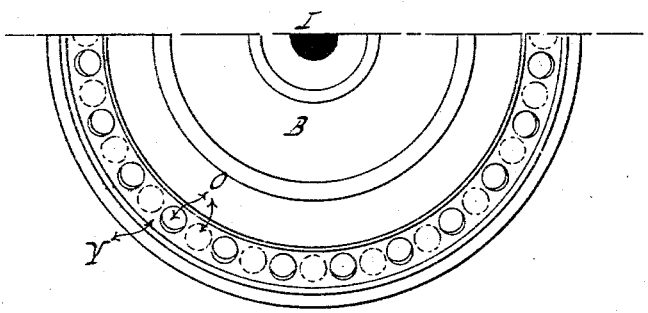
Witnesses
William Miller
Otto Hufeland
Inventor
Conrad Zimmer
by his attorneys (No Model.) 4 Sheets—Sheet 2.
C. ZIMMER.
PROCESS OF PREPARING AND PURIFYING WORT FOR BREWING PURPOSES.
No. 315,876. Patented Apr. 14, 1885.
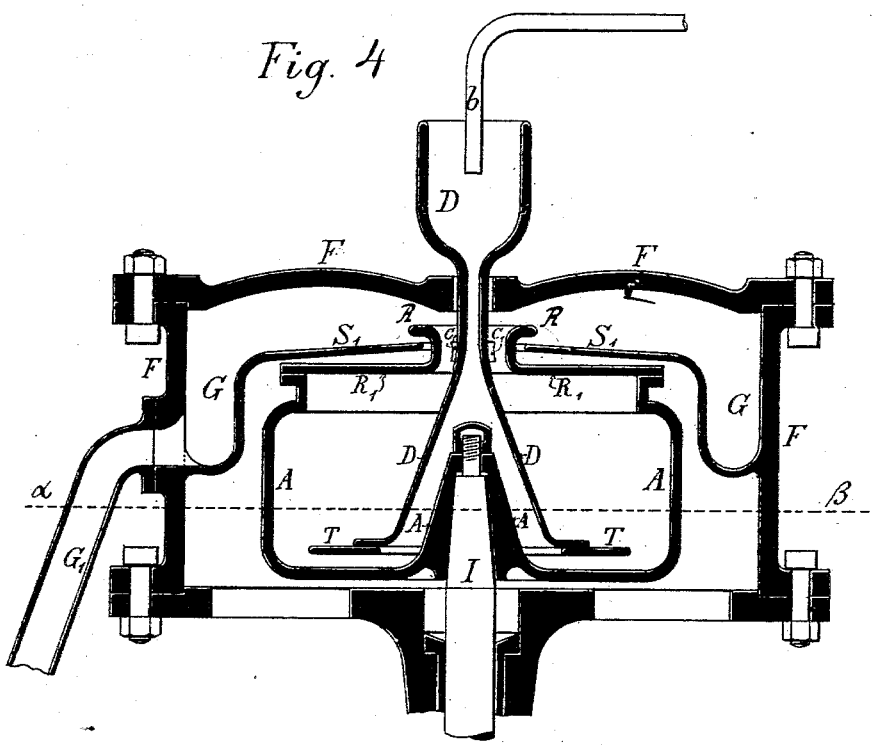
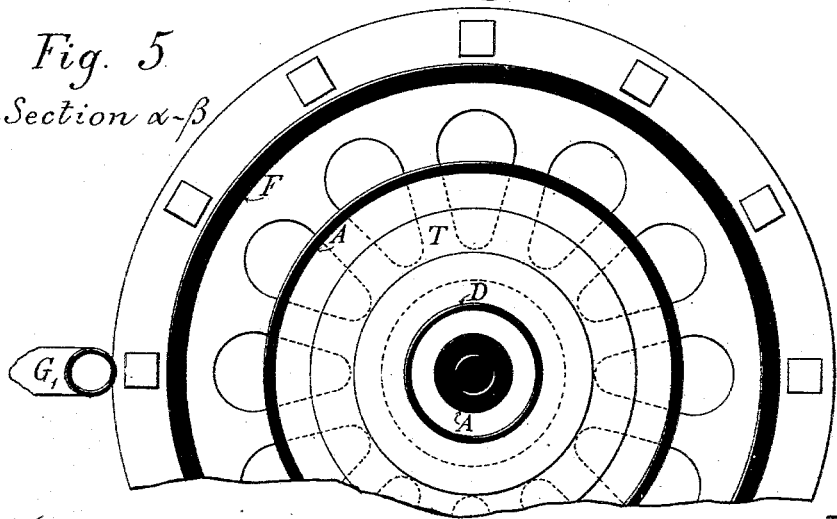

(No Model.) 4 Sheets—Sheet 3.
C. ZIMMER.
PROCESS OF PREPARING AND PURIFYING WORT FOR BREWING PURPOSES.
No. 315,876. Patented Apr. 14, 1885.

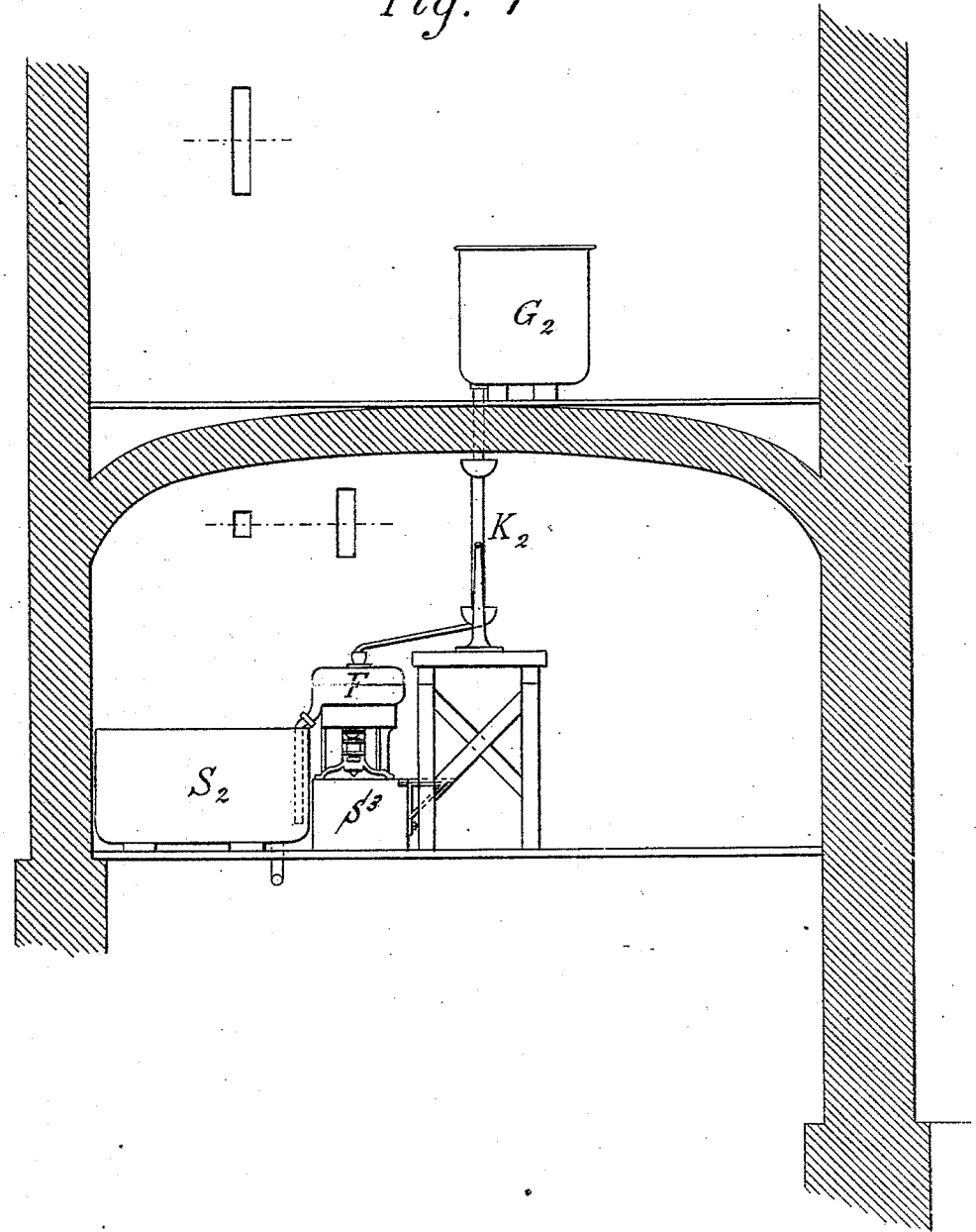

UNITED STATES PATENT OFFICE.

CONRAD ZIMMER, OF FRANKFORT-ON-THE-MAIN, PRUSSIA, GERMANY.

PROCESS OF PREPARING AND PURIFYING WORT FOR BREWING PURPOSES.

SPECIFICATION forming part of Letters Patent No. 315,876, dated April 14, 1885.

Application filed July 17, 1884. (No model.) Patented in Germany July 1, 1883, No. 26,797.

*To all whom it may concern:*

Be it known that I, CONRAD ZIMMER, a subject of the King of Prussia, German Empire, residing at Frankfort-on-the-Main, Prussia, Germany, have invented new and useful Improvements in Process of Preparing and Purifying Wort for Brewing Purposes, of which the following is a specification.

This invention consists in a process for preparing and purifying wort for brewing purposes, which will be hereinafter fully described, and then specifically pointed out in the claims.

In carrying out my process I advantageously make use of an apparatus, hereinafter more fully described, and illustrated in the accompanying drawings, in which—

Figure 1 is a vertical central section of a centrifugal machine. Fig. 2 is a similar section of a modification. Fig. 3 is an inverted detail plan view of the bottom of the drum of Fig. 2. Fig. 4 is a vertical central section of a modification of the structure of Fig. 1. Fig. 5 is a section in the plane $a$ B, Fig. 4. Fig. 6 is a vertical central section of a hops kettle or boiler. Fig. 7 is a side elevation of the general arrangement of the apparatus.

Similar letters indicate corresponding parts.

The pure wort, after having been collected in the hops-kettle, is boiled with the ordinary quantity of hops corresponding to the taste of the consumer.

The hops kettle or boiler is illustrated in Fig. 6, and is provided with a funnel-shaped or converging bottom, $A^2$, so that the albuminous matter precipitated by the tannic acid of the hops may settle in such bottom and be drawn off, thus avoiding its being carried along into the succeeding processes of refrigeration, fermentation, and storage. This boiler is surrounded in great part by a steam-jacket, into which steam is introduced for boiling the hops with the wort. When the boiling process is completed, the steam is shut off and water is introduced into the steam-jacket to cool the contents of the boiler. The wort thus treated is fed off through the bottom of the boiler to the collecting vessel or tank $G^2$, Fig. 7. In flowing out through the bottom $A^2$ of the boiler the wort is filtered by the filtering-layer formed by the hops. The wort so filtered should be refrigerated or cooled to about 18° centigrade, which may be done by means of well-water flowing through pipes, over which pipes the beer is led, or in any well-known and suitable manner. The refrigerator is indicated in the drawings by $K^2$. During this refrigeration albuminous matter is again precipitated, which albuminous matter does not contribute to feed the yeast. In the process of fermentation and storage this albuminous matter, if allowed to remain, would be dissolved and be prejudicial to the quality and storing of the beer; hence it is necessary that such albuminous matter be removed. This albuminous matter I separate from the wort by means of centrifugal force, as I have found that liquids are easily separated by centrifugal force from matter contained therein of a different specific gravity from the liquid. The wort coming from the refrigerator $K^2$ and cooled to a proper temperature is introduced into the centrifugal machine, the outer wall or shell of which is indicated by the letter F, Figs. 1, 2, 4, 5, and 7.

In Fig. 1, A is a drum, open above and below and joined by ribs or braces C to the bottom B, mounted on the driving-shaft I, to which a revolving motion is imparted, thus revolving the drum A and bottom B. The outer shell or casing, F, remains stationary, and is shown supported on arms M, joined to a cap, L, and which cap L is provided with a ridge or wall, L', to prevent any of the material issuing from the passage H at the lower part of the drum A from flowing or being thrown against the shaft I.

D is a funnel having two passages, E E. Into the central passage leads the tube $b$ from the refrigerator $K^2$. This funnel is shown as introduced into the centrifugal machine from above and resting on the roof or cover of the shell F. A ring or shoulder, $a$, determines the position of the funnel D. The funnel D is intended to be fixed and not to participate in the movement of rotation. The liquid to be treated enters through the pipe $b$ and passes through the central channel, E, of the funnel D into the bottom B of the revolving drum A, said bottom B revolving with its drum. By this rotation the liquid coming onto the bottom B is thrown outward against the wall of the rotating drum A, where it is separated into its two parts, the lighter part of the liquid being thrown over the rim R of the drum A and collected in the space G, from whence it is led off by a conduit or spout, G', into a collecting tun or receiver, S³, Fig. 7. The specifically heavier parts of the liquid pass off through the channel or passage H at the lower part of the drum A and fall through the open bottom of the shell F, and may be caught in any convenient receptacle S³, Fig. 7. At the beginning of the operation somewhat more liquid passes off through the channel H than later on when such passage H has become somewhat clogged or stopped by a layer of material having some consistency. The rim R of the drum A flares outwardly, so as to cause the liquid to be thrown well into the space G and prevent any of it flowing down through the case F. Near the rim R in the drum A is a sieve or strainer, which prevents any slight impurities in the liquid from passing out above the drum A. A shoulder or ring, S, in the drum A, and which sits close about the funnel D, forces the liquid to flow out through the sieve or strainer and prevents any liquid passing out at the top of the drum A without flowing through such sieve.

During the operation of the machine, air enters through the passage or orifices $e$ of the funnel D into the channel E of said funnel surrounding the central channel, and such air flowing out through the passage or orifices $c$ at the lower part of the funnel D becomes mixed with the liquid passing out from the central channel, E, of the funnel D. The air mixing with the liquid saturates it with oxygen, and also cools or refrigerates the liquid. The air escapes either with the liquid passing over the brim R, or else it escapes through the passage or orifices $f$ of the funnel D.

In the modification shown in Figs. 2 and 3 the sieve, instead of being placed at the top of the drum A, is placed about the casing at S'. The passage or orifices $f$ for the escape of the air are in the roof of the shell F. A slide or valve, Y, Fig. 2, shown as consisting of a ring, with perforations or orifices corresponding to the orifices O in the bottom B of the drum, is so placed at the beginning of the operation as to close or partially close said orifices O to prevent too much liquid flowing off through the passage H. After some time, when a sufficiently strong layer of consistent material has been formed by the material of greater specific gravity than the liquid in the drum A, the valve or slide Y is turned so as to open the orifices O and allow the heavier parts to flow away.

The apparatus can be easily cleaned by taking out the funnel D, thus gaining access to the interior. Access to the interior is also had through the open bottom of the case F.

In the modification shown in Figs. 4 and 5 the clarified liquid can be led off very near to the axis of rotation, thus avoiding formation of froth. The drum A in this case is joined by braces or ribs C' to the funnel D, so as to cause the funnel to revolve with the drum. The funnel is made a little more spacious than in the case of Fig. 1, to prevent the wort entering through $b$ from overflowing. On the lower part the funnel D is provided with a ring or plate, T, to lead the wort near to the wall of the drum A. In this case the albuminous matter is deposited in the drum A, and must be removed from time to time, which can be done by stopping the rotation and taking the funnel D out of the drum. It is, however, possible to provide the bottom of the drum with perforations like the perforations O in Figs. 2 and 3, adapted to be closed by a valve or ring, Y, thus allowing the heavy matter to fall out of the drum and through the open bottom of the case F. The cover R' of the drum A sits close about the funnel D, so as to leave only sufficient space for the exit of the clarified wort. The clarified wort flows over the rim R to the inclined plate or cover S', and from it flows into the collecting-space G and to the spout or conduit G' into the collecting-vessel S². The funnel D should be capable of easy removal from the drum A, and for this purpose the cover of the casing F should be so fastened as to be easily taken off, as should also the cover R'. This can be accomplished by using a few screws or other suitable fastening devices to attach the cover of the shell F and the cover R'. The plate or cover S' must also be removable, and it can be made in the form of a cap sitting over the inner wall of the collecting-space G. The cover of the casing F and the plate S' must each be made in two parts, which can be slid or pushed together before being fixed in place. The funnel D may also consist of several parts, which can be pushed or telescoped onto one another, as seen in Fig. 4.

I am aware that it is not new to separate the husk, fiber, gluten, and other solid matter from the fluid part of the wort employed in the manufacture of distilled spirits by the action of centrifugal force in an ordinary hydro-extractor. This forms no part of my invention, as the same relates exclusively to the preparation of the wort used in the art of brewing malt liquors which involves steps or processes in addition to the general idea of extracting solids from liquids by centrifugal force.

What I claim as new, and desire to secure by Letters Patent, is—

1. The herein-described process of preparing wort for brewing purposes, consisting in boiling the wort with hops, then cooling the wort and discharging and filtering it through a layer of hops in the wort-boiler, then refrigerating the wort for precipitating the albuminous matter therein, and then removing such matter and all solids contained in the wort by passing the latter through a centrifugal machine, substantially as and for the purpose set forth.

2. The process of purifying wort, removing coagulated albuminous matter therefrom, and preparing it for fermentation, consisting in passing the wort through a centrifugal machine, and while in the latter subjecting it to the action of a current of atmospheric air for oxygenating and cooling the liquid, substantially as herein set forth.

In testimony whereof I have signed my name to this specification in the presence of two subscribing witnesses.

CONRAD ZIMMER.

Witnesses:
HELLMUTH OTTINGER,
B. ROI.